Aug. 18, 1970     C. PECOTT     3,524,989

AUTOMOBILE IGNITION PROTECTION SYSTEM

Filed March 18, 1968     2 Sheets-Sheet 1

United States Patent Office 3,524,989
Patented Aug. 18, 1970

3,524,989
AUTOMOBILE IGNITION PROTECTION SYSTEM
Clyde Pecott, 68 Edwards St.,
Wethersfield, Conn. 06109
Filed Mar. 18, 1968, Ser. No. 713,708
Int. Cl. B60r 25/00
U.S. Cl. 307—10                           6 Claims

ABSTRACT OF THE DISCLOSURE

A protective system for controlling the starting and, if desired, the admission to an automobile without the requirement of the utilization of ignition keys or the like. The system includes a pair of relays that are controlled through a push type selector switch having a relatively large number of stations. The actuation of one relay is dependent upon the prior actuation of the other relay with each being activated only at a particular and a different station of the selector switch. Once energized each of the relays has a self-holding feature or contact. After energization of the relay the automobile may be started by the selector switch through its manipulation at another station. There are many stations of the switch where if the contacts of the switch are engaged both relays will become de-energized.

BACKGROUND AND BRIEF DESCRIPTION

The invention is directed to an improved protective system for an automobile which will prevent all but authorized persons from starting the automobile and if desired gaining access to the automobile. There have in the past been many suggestions in connection with systems for controlling the ignition circuit of an automobile in a manner to attempt to prevent theft of the vehicle. Some of these systems have eliminated the necessity of utilizing a conventional ignition key. However all such past systems have had one or more undesirable characteristics in the nature of being relatively complicated, undependable, unduly costly or the like. The present invention provides a feasible and economic arrangement for controlling an automobile's ignition system and also, if desired, for controlling access to the automobile, without the utilization of the conventional ignition key and with it only being necessary to mount a simple single rotatable switch mechanism on the dash of the automobile in place of the present key switch and a similar switch mechanism, if desired, in the door of the automobile. The arrangement is such that by manipulating the switch to a plurality of stations by means of rotating the switch and then pushing it inward to momentarily engage the switch contacts a pair of relays are operated in sequence so as to activate the ignition system and thereafter activate the starter solenoid. One who does not know the proper sequence of operation of the switch will find it virtually impossible to effect operation of the automobile since there are numerous stations on the switch which when engaged deactivate the pair of relays.

The switch mounted in the door of the automobile may be generally similar to that provided in the dash with this switch being effective to provide actuation of an electrical mechanism to unlock the automobile door and with there being no station on this switch for effecting starting of the automobile. The proper sequence of actuation of the switch must be followed and if there is a mistake made in carrying out this sequence the sequence must be initiated from the beginning since any such mistake will completely deactivate the relay mechanism and require that the prescribed procedure must be started all over.

Figure 1:
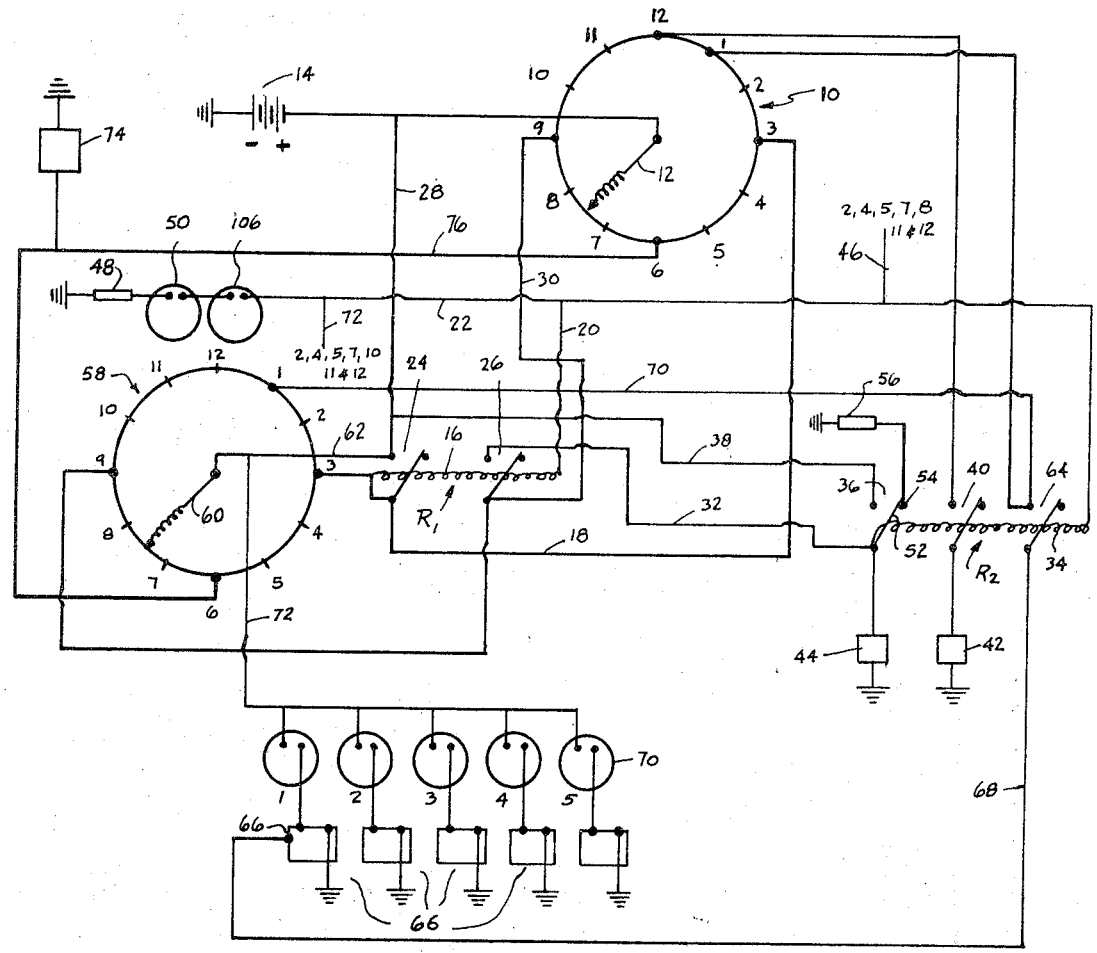
FIG. 1 is in the nature of a circuit diagram of the inventive improvement.

Referring now to the drawings, wherein like reference numerals are used throughout to designate like elements, the illustrative and preferred embodiment, particularly as diagrammatically illustrated in FIG. 1, includes a pair of relays designated $R_1$ and $R_2$ with relay $R_1$ being effectively controlled by relay $R_2$. Both of these relays are in turn controlled by the selector switch 10 which in the illustrative embodiment has twelve stations and thus effectively being twelve switches in one. The switch is of the type that contacts are normally open with the contacts being closed only through the application of pressure to the switch and upon release of the pressure the contacts are again open. The switch construction will be described in more detail later and it will suffice now to state that there is a sweep arm 12 which rotates about the axis of the switch. This arm is continuously connected to one side of a battery 14 with the other side of the battery being grounded. The arm may be rotated to any one of the twelve designated stations and when at such a station if the arm is pushed inward the switch contacts for that station will be engaged connecting the battery to the contact of the particular station.

The actuation of relay $R_1$ is initially controlled through the contact at station 3 of switch 10. Upon engaging this station with arm 12 coil 16 of relay $R_1$ is connected through conductor 18 to one side of the battery 14. The other end of this coil 16 is connected through conductors 20 and 22 to ground and thus the other side of the battery. This will effect energization of relay $R_1$ which in turn will move the holding contacts 24 of the relay and the contacts of switch 26 of the relay to their respective closed positions. It will thus be evident that the contact of selector switch 10 must be only momentarily engaged with the station 3 to energize the relay $R_1$. Thereafter the holding contacts which connect the relay with the positive side of battery 14 through conductor 28 will maintain the relay energized. If after thus energizing the relay the selector switch 12 is moved to the station 9 and the contact at this station momentarily engaged the energizing circuit for relay $R_2$ will be completed. This circuit will include the following, extending from the station 9; i.e. conductor 30, the closed contacts of switch 26, conductor 32, coil 34 of relay $R_2$ and conductor 22 which connects the other end of the coil to ground and thus completes the circuit.

Energization of relay $R_2$ moves the holding contacts 36 into their engaged position thus connecting the relay directly with the plus side of battery 14 through conductors 38 and 28 in by pass relation with the contacts at station 9 of switch 10. Therefore the rely will remain energized when the contacts at station 9 are opened. There is provided with the relay $R_2$ the switch 40 which is normally open but moved to a closed position upon energization of the relay. This switch is in the circuit of the starter relay 42 of the automobile. It is noted that the engagement of the holding contacts 36 also completes the circuit with the ignition coil 44 of the automobile. Also in series with the switch 40 and started relay is the contact of station 12 of switch 10. Thus by moving sweep arm 12 to station 12 and manipulating the switch to engage the contact at this station starter relay 42 is energized.

It will thus be appreciated by momentarily engaging the contacts at station 3 relay $R_1$ is activated and locked in. Thereafter by momentarily engaging the contact at station 9 relay $R_2$ will be energized and locked in. Ignition coil 44 will then be in a completed circuit such that momentarily engaging the contact at station 12 and thus activating starting 42 should result in the engine of the automobile starting. Relay $R_1$ must be energized before relay $R_2$ can be energized and thus the aforementioned prescribed sequence must be followed. If any of the other stations of the switch 10 (with the exception of station 1 which will be explained later) are momentarily engaged the result will be to de-energize both of the relays $R_1$ and $R_2$ such that the prescribed sequence must be repeated in order to effect starting of the engine. Each of these stations 2, 4, 5, 6, 7, 8, 10 and 11 are connected to ground through the conductor 46 and the conductor 22. There is provided in the conductor 22 a current limiting resistor 48 which is of such a value as to prevent undue current flow but at the same time to provide a sufficient short circuit across the coils of relays $R_1$ and $R_2$ to result in de-energization of these relays.

As an extra safety feature there may be connected into the conductor 22 the switch 50 which is preferably actuated by the operation of the door adjacent the driver of the automobile. This switch can be so arranged that upon opening the door the switch moves to an open position thereby preventing running the engine of the automobile with this door open.

There may be also added the safety feature of grounding the ignition coil of the automobile when the protective circuit of the engine is in a de-energized or de-activated condition thereby preventing someone from connecting the coil to the source of potential through an extra or cheater wire and thereby starting the engine of the automobile. In the illustrative embodiment this grounding is effected by having the armature 52 of the holding switch of relay $R_2$ engage the contact 54 when the relay $R_2$ is de-energized. This contact 54 is in turn connected to ground through the resistor 56. The value of this resistor is sufficiently small so that the current drain upon application of a cheater wire to the coil will be such as to prevent operation of the coil. The resistor however is sufficiently large so as to provide for energization of relay $R_2$ upon momentarily engaging the contact at station 9 after relay $R_1$ has previously been energized.

The circuit of the invention is readily adaptable to the utilization of a multi-station normally open-hold to close-type selector switch in the door of the automobile to control unlocking of the door and thus access to the automobile. Thus an additional switch 58 may be provided and may be mounted at the location of the usual key operated lock in the door of the automobile. This switch is similar in construction to switch 10 and has a rotating contact arm 60 connected with the plus side of the battery through conductor 62 and 28. This switch is connected into the same relays $R_1$ and $R_2$ in the same manner as switch 10 such that upon momentarily engaging the contact at station 3 relay $R_1$ will be energized and upon momentarily engaging contact at station 9 relay $R_2$ will be energized. In order to control unlocking of the door of the automobile there is provided in relay $R_2$ still another switch 64. This switch is in the normally open position and moved to a closed position upon energization of relay $R_2$. In the closed position the switch completes the circuit to the solenoid 66 which will unlock the door. This latter circuit includes the conductor 68 and the conductor 70 with this last-mentioned conductor being connected with the contact at station 1 of both the switch 58 and the switch 10. Thus momentary engagement of the contacts at this location 1 of either of these switches while relays $R_1$ and $R_2$ are energized will effect an unlatching of the door of the automobile.

There are illustrated additional solenoids 68 for controlling locking of the automobile doors with there being manually operable switches 70 connected to the battery through conductors 72 and 28 to manually control the solenoids.

It will be appreciated that upon manipulation of the switch 58 through the sequence engagements of the contacts at stations 3, 9 and 1 in order to gain access to the automobile the relays $R_1$ and $R_2$ are then in their energized condition and if the circuit is not equipped with the door operated switch 50 it will only be necessary to move the switch 10 to the position where engagement of station 12 can be effected and then to engage this station to start the automobile.

It will be appreciated that in switch 58 the stations 2, 4, 5, 7, 8, 10, 11 and 12 are connected with ground, this being effected through the conductor 72. It may be desired to connect one or more of the stations of each of these switches to a horn and in the illustrative embodiment there is provided a horn 74 which is connected to station 6 of both of the switches through the conductor 76. The effect here will be to both blow horn 74 and de-energize relay $R_1$ and $R_2$ when either of the switches 58 or 10 engages the contact at the station 6. Such engagement, as in other stations of the switches, acts as a short of the relays $R_1$ and $R_2$ and the impedance of horn 74 is sufficiently low that de-energization of the relays will result.

Figure 2:
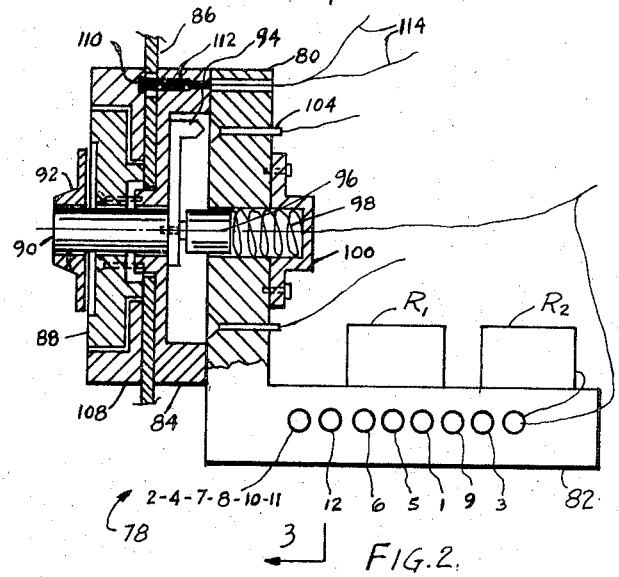
FIG. 2 is a partial vertical section through one of the multi-station normally open-hold to close-type selector switches.
Figure 3:
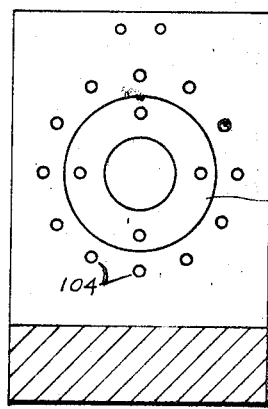
FIG. 3 is an elevational view taken generally from line 3—3 of FIG. 2.
Figure 4:
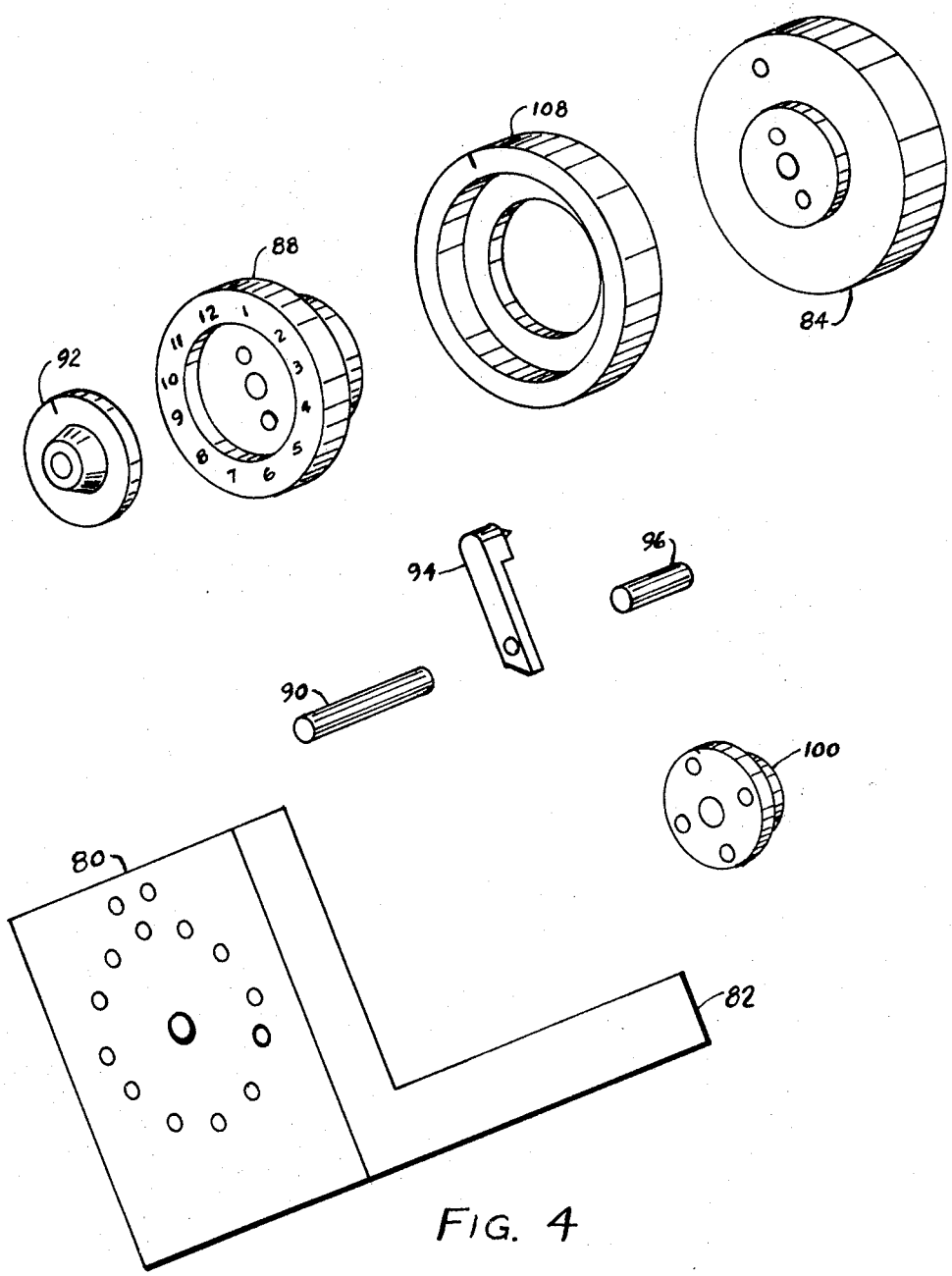
FIG. 4 is in the nature of an exploded view of the selector switch.

The details of the switches 10 and 58 are disclosed in FIGS. 2, 3 and 4 and they include the frame member 78 having an upright leg 80 and a horizontally extending leg 82. Secured to the leg 80 is a forwardly directed extentension 84 which is provided with a boss that extends through an opening in the dashboard 86 of the automobile. Mounted on the other side of the dashboard is the disc or cylindrical member 88 with this member being secured to extension 84 by suitable screws as shown. A shaft 90 extends through aligned opening in members 84 and 88 and has mounted on its outer end an actuating knob 92 and on its inner end a switch arm 94. The shaft 90 and its attachment are biased outwardly (to the left in FIG. 2) by means of the plunger 96 and spring 98 with the spring being retained in place by the retaining member 100. Plunger 96 and switch arm 94 are made of electrical conducting material with the plunger being connected through the wire 102 to the plus side of battery 14. The remainder of the switch elements are preferably constructed of non-conducting material. The member 88 is provided with suitable indications of the various stations and in corresponding relation with each of these stations there is mounted in the upright leg 80 a contact 104 (of conducting material) which is connected to the desired portion of the circuit for the particular station. The switch is operated as follows. The knob 92 is rotated to the desired station as indicated. The switch arm 94 of course follows and corresponds with this desired station. When at the station the knob 92 is pushed inward such that the distal end of the switch arm contacts and engages the particular contact 104 at the station. A connection is thus established to the plus side of the battery 14 with whatever circuit the particular station is connected into. Upon release of the knob 92 the switch moves to its retracted or disengaged position. Accordingly, it will be appreciated that with this switch the aforementioned operation of the circuit of the invention is readily achieved.

In order to provide an even larger number of combinations and permutations and to make it still more difficult for a world-be thief to operate the automobile there may be provided an additional switch in the ground connection of each of the relays $R_1$ and $R_2$ which switch must be in a particular position in order that the circuit to the relays may be completed. In FIG. 1 the switch is identified as 106 and in the detailed mechanism of FIGS. 2, 3 and 4 it takes the form of disc member 108 rotatably mounted about the member 88. This mounting is such as to permit rotation of member 108 about the axis of shaft 90 with there being sufficient friction in the rotation of member 108 to prevent it from being accidentally or through jarring moved out of a particular desired position. The member 108 has provided on its rear surface a small arcuate conducting region 110. The main portion or the remainder of member 108 is made of a non-conducting material. This small arcuate portion 110 is intended to bridge a pair of contacts 112 mounted in the extension 84 in close but separated lateral positions. These contacts 112 are spring biased into engagement with the member 108. Each of the contacts is connected with a conductor 114 which are in turn connected into the conductor 22 when this particular feature of the invention is utilized. The arrangement may be such that when the index 116 provided on the front of member 108 is in its uppermost position the arcuate portion 110 will bridge the contacts 112. In any other position of the member 108 the contacts will not be bridged and therefore it will be impossible to energize the relays $R_1$ and $R_2$.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A protective circuit for automobiles comprising in combination a source of electrical potential, a first electromagnetic relay, a second electromagnetic relay connected so that it can be energized only after energization of said first, both of said relays having holding contacts, a multi-station normally open-hold to close-type switch having one station in series with the coil of said first relay, a second station in series with the coil of said second relay through contacts closed only when the first relay is energized, said second relay having contacts closed only when the second relay is energized, a first set of such second relay contacts adapted to be in series with the ignition coil of the automobile, a second set of such second relay contacts adapted to be in series with the starter solenoid of the automobile, and another of the stations of said multi-station switch being in series with said second set of contacts, said selector switch having many other stations that are effectively in parallel relation with the coils of the relays so as to be effective, when engaged, to provide an effective short circuit of said coils and thus de-energize the relays, a current limiting resistor in series with said numerous stations so as to limit the current flow in this effective short circuit with the value of this resistor being sufficiently low to provide the desired short circuit effect.

2. The protective circuit of claim 1 wherein the several stations of the selector switch are positioned about a common axis at different angular locations, said switch having a portion rotatable about said axis and biased outwardly such that contacts of the switch are out of engagement during rotation of said portion, said portion being movable inwardly to close a pair of contacts when at any particular station location.

3. The protective circuit of claim 1 including an additional multi-station normally open-hold to close-type switch having a pair of stations in parallel with said first and second stations and also having an additional station, an additional pair of contacts engaged only when the second relay is energized, these last-named contacts being in series with said additional station and adapted to be in series with electrical means for unlocking a door of the automobile.

4. The protective circuit of claim 1 including a door operated switch in the circuit of each of said relays effective to de-energize said relays in response to a door of the automobile opening.

5. A protective circuit for automobiles comprising in combination a source of electric potential, a first relay, a second relay connected so that it can be energized only after energization of said first, both of said relays having holding contacts, a multi-station normally open-hold to close-type switch having one station in series with said first relay, a second station in series with said second relay through contacts closed only when the first relay is energized, said second relay having contacts closed only when the second relay is energized, a first set of such second relay contacts adapted to be in series with the ignition coil of the automobile, a second set of such second relay contacts adapted to be in series with the starter solenoid of the automobile, and another of the stations of said multi-station switch being in series with said second set of contacts, means effective to ground the ignition coil of the automobile when said second relay is de-energized, said selector switch having many other stations in parallel with said relays such that when selectively engaged both of said relays are de-energized.

6. The protective circuit of claim 5 wherein the holding switch for the second relay is a double throw switch occupying a holding position for the relay when the relay is energized and connecting the ignition coil of the automobile to ground when the relay coil is de-energized, a resistor positioned in the last-mentioned ground connection of a sufficiently low value to prevent operation of the ignition coil but of a sufficient high value to permit energization of said second relay.

References Cited

UNITED STATES PATENTS

| 1,251,365 | 12/1917 | Gilmore | 70—278 |
| 1,587,757 | 6/1926 | Carlson | 70—278 |
| 2,606,237 | 8/1952 | Chase | 70—278 X |
| 2,650,989 | 9/1953 | Heath | 307—10 |
| 2,897,376 | 8/1959 | Rieckman | 307—10 |

HERMAN O. JONES, Primary Examiner

T. B. JOIKE, Assistant Examiner

U.S. Cl. X.R.

70—278; 180—114